United States Patent
Mondshine et al.

(10) Patent No.: US 6,252,511 B1
(45) Date of Patent: Jun. 26, 2001

(54) REAL-TIME BATTERY GAUGE DISPLAY

(75) Inventors: James L. Mondshine; Dan V. Forlenza, both of Cypress; Kevin R. Frost; Greg B. Memo, both of Spring, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/879,911

(22) Filed: Jun. 20, 1997

(51) Int. Cl.$^7$ .................................................. G08B 21/00
(52) U.S. Cl. ............................... 340/636; 702/63; 320/48
(58) Field of Search ............................. 340/636; 324/427, 324/426, 436; 395/834, 750.01, 750.03, 750.06, 750.07; 320/48; 702/63, 65

(56) References Cited

U.S. PATENT DOCUMENTS

| | | | |
|---|---|---|---|
| 4,716,354 | * 12/1987 | Hacker | 320/39 |
| 5,230,074 | * 7/1993 | Canova, Jr. et al. | 395/750 |
| 5,339,446 | * 8/1994 | Yamasaki et al. | 395/750 |
| 5,345,392 | * 9/1994 | Mito et al. | 364/483 |
| 5,434,508 | * 7/1995 | Ishida | 324/427 |
| 5,477,129 | * 12/1995 | Myslinski | 320/48 |
| 5,691,742 | * 11/1997 | O'Connor et al. | 345/116 |
| 5,768,164 | * 6/1998 | Hollon, Jr. | 364/710.14 |
| 5,789,901 | * 8/1998 | Lomholt | 320/134 |
| 5,801,637 | * 9/1998 | Lomholt | 340/815.69 |
| 5,809,449 | * 9/1998 | Harper | 702/63 |

FOREIGN PATENT DOCUMENTS

| | | |
|---|---|---|
| 0564092 A2 | 10/1993 | (EP) . |
| 0588084 A2 | 3/1994 | (EP) . |
| 0588084 A3 | 3/1994 | (EP) . |

OTHER PUBLICATIONS

WinBook Computer Corporation, *Big Price Drop*, Fall 1997, pp. 2–19.

* cited by examiner

*Primary Examiner*—Daniel J. Wu
*Assistant Examiner*—Toan N. Pham
(74) *Attorney, Agent, or Firm*—Akin, Gump, Strauss, Hauer & Feld, LLP

(57) ABSTRACT

A portable computer system incorporating a multi-purpose status display module that is visible when the main video display is in either an open or locked condition. The status display module is used as an autonomous, real-time battery gauge. The battery gauge display allows a user to monitor the charge status of a battery pack when the system is powered up, when the battery is being recharged by an AC adapter, or when the portable computer is placed into a secondary operating mode. Control signals for the status display are generated by a multi-purpose microcontroller. Battery charge conditions are displayed from 0% to 100% in 10% increments, allowing the computer user to accurately estimate the amount of computing time sustainable by an installed battery pack. The battery gauge display functions independently of the portable computer's operating system, and the computer user need not initiate a software process in order to ascertain remaining battery life. The invention is particularly useful when the portable computer system is being utilized as a stand-alone CD player or in other non-standard operating modes.

18 Claims, 4 Drawing Sheets

REAL-TIME BATTERY GAUGE DISPLAY

BACKGROUND OF THE INVENTION

1. Field of the Invention

The invention relates to a circuit and method for displaying battery charge conditions in a portable computer system, and more particularly to a real-time battery gauge display that functions independently of the operating system.

2. Description of the Related Art

Computers are often needed in mobile environments where conventional alternating current power is not available. In such conditions, rechargeable batteries cells are typically used as an alternate source of power. Many acceptable battery technologies exist or are being developed, including nickel-cadmium (NiCd), nickel-metal-hydride (NiMH), lithium ion (Li+) and lithium polymer batteries. These battery cells are capable of providing power to a portable computer system for several hours. The battery cells are incorporated in a battery pack, with the battery cells typically arranged in series fashion. The battery pack is usually recharged in either an external charger or by the power supply of the host computer system.

Despite the mobility allowed by rechargeable batteries, charge cycle life is limited. For this reason, a sensor circuit is often integrated into the battery pack to monitor the voltage of each battery cell and to provide fuel gauging capabilities. Fuel gauging is the process of determining how much useful charge remains in a battery cell or battery pack, and is typically accomplished by Coulomb counting. The sensor circuit typically monitors the battery for undervoltage, overvoltage, overcharge current, and overdischarge current, allowing the battery pack to be accurately charged and discharged.

In what are known as "intelligent" battery packs, the sensor circuit within the pack supplies battery cell information to a battery microcontroller. The microcontroller, in turn, determines whether the battery pack needs to be charged, can be discharged, or is no longer usable. This information can be communicated to the host computer system. A battery pack of this type also includes a charge switch and a discharge switch, controlled by the microcontroller, which enable or disable the charging or discharging of the battery pack according to the state of the battery cells.

In many current portable computers, charge information supplied by the battery microcontroller is converted and displayed on the computer's main video display via a software process. In general, the computer user must take affirmative action to initiate execution of the software process. Although execution of the battery gauge software can be simplified by the use of hot keys or icons, this method of displaying useful battery life suffers from an additional drawback—the portable computer must first be powered-up and the operating system initialized before the software process can be executed. Such a process can be time-consuming for a user merely wishing to ascertain the charge condition of a battery pack.

Some portable systems incorporate a lighted electronic diode (LED) or liquid crystal display (LCD) capable of providing battery charge information. These systems also suffer from practical limitations. A simple LED merely conveys whether a battery pack is capable of powering the computer system. Again, the user must reference a software battery gauge in order to effectively estimate the amount of operating time remaining before battery recharging becomes necessary.

Improved functionality and ease-of-use in the techniques for determining remaining battery life would be desirable.

SUMMARY OF THE INVENTION

Briefly, a portable computer system according to the invention incorporates an autonomous, real-time battery gauge display that is viewable when the main video display is in a closed or locked state. The battery gauge display allows a user to monitor the charge status of a battery pack when the system is powered up, when the battery is being recharged by an AC adapter, or when the portable computer is placed into a secondary operating mode. The battery gauge display functions independently of the portable computer's operating system, and the computer user need not initiate a software process in order to ascertain remaining battery life.

The disclosed embodiment of the battery gauge display is part of a multi-purpose LCD status display module connected to the system motherboard. Control signals for the LCD status display are generated by a multi-purpose microcontroller. The microcontroller receives battery status information from a battery microcontroller and is capable of controlling the LCD status display independently of the computer's operating system. Battery charge conditions are displayed from 0% to 100% in 10% increments, allowing the computer user to accurately estimate the amount of computing time sustainable by an installed battery pack. The invention is particularly useful when the portable computer system is being utilized as a stand-alone CD player or in other non-standard operating modes.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following patents and applications are hereby incorporated by reference:

Commonly-assigned U.S. patent application Ser. No. 08/846,641, entitled "COMPUTER SYSTEM CAPABLE OF PLAYING AUDIO CDS IN A CD-ROM DRIVE INDEPENDENT OF AN OPERATING SYSTEM," by Tim L. Zang, Greg B. Memo, Kevin R. Frost, filed Apr. 30, 1997; and Commonly-assigned U.S. patent application Ser. No. 08/879,876, entitled "CONTROLS AND INDICATORS FOR A SECONDARY OPERATIONAL MODE OF A COMPUTER SYSTEM," by William E. Jacobs, Daniel V. Forlenza, James L. Mondshine, Gregory B. Memo, and Kevin R. Frost filed concurrently herewith; both of which are assigned to the assignee of this invention.

Figure 1A:
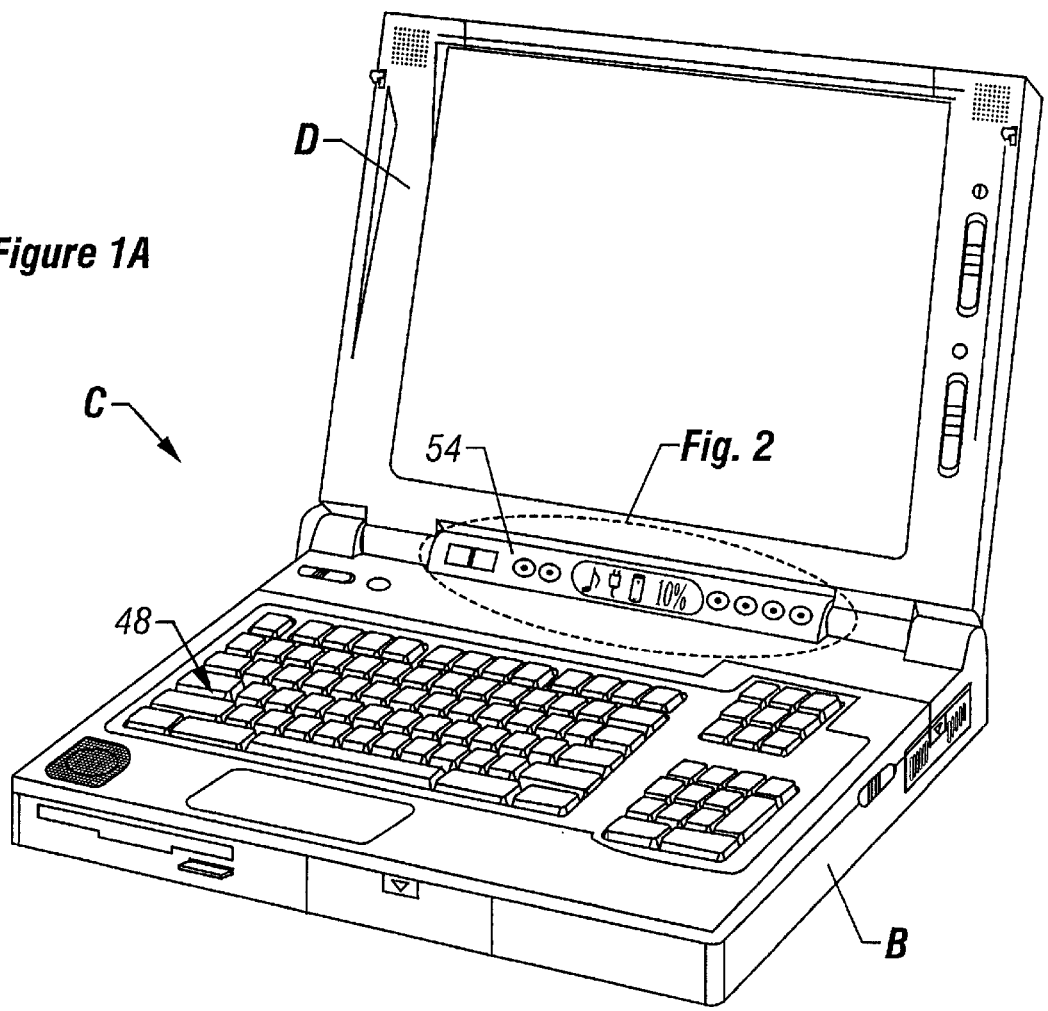
FIGS. 1A and 1B are isometric views of a portable computer system incorporating a battery gauge display according to the present invention.
Figure 1B:
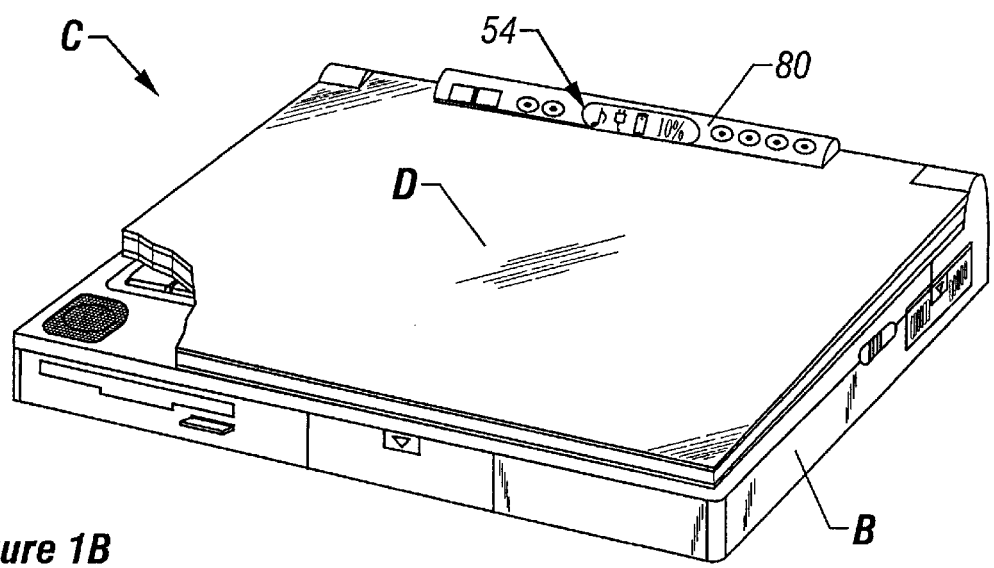

Referring now to the drawings, FIGS. 1A and 1B are isometric views of a portable computer system C incorporating a battery gauge display according to the present invention. The computer system C has a base portion B and a display D portion. The base portion includes the keyboard 48 and a status display 54 conforming to the present invention. The status display 54 is integrated into a readily visible portion 80 of the base portion B that is visible when the display D is in either an open position (FIG. 1A) or a closed or locked position (FIG. 1B). A user of the computer system C is thereby able to ascertain the charge state of any installed battery packs without opening the display D. The display technology utilized in by the display D may be of any suitable type, although low-power technologies such as liquid crystal display (LCD) and thin film transistor (TFT) are preferred.

Figure 2:
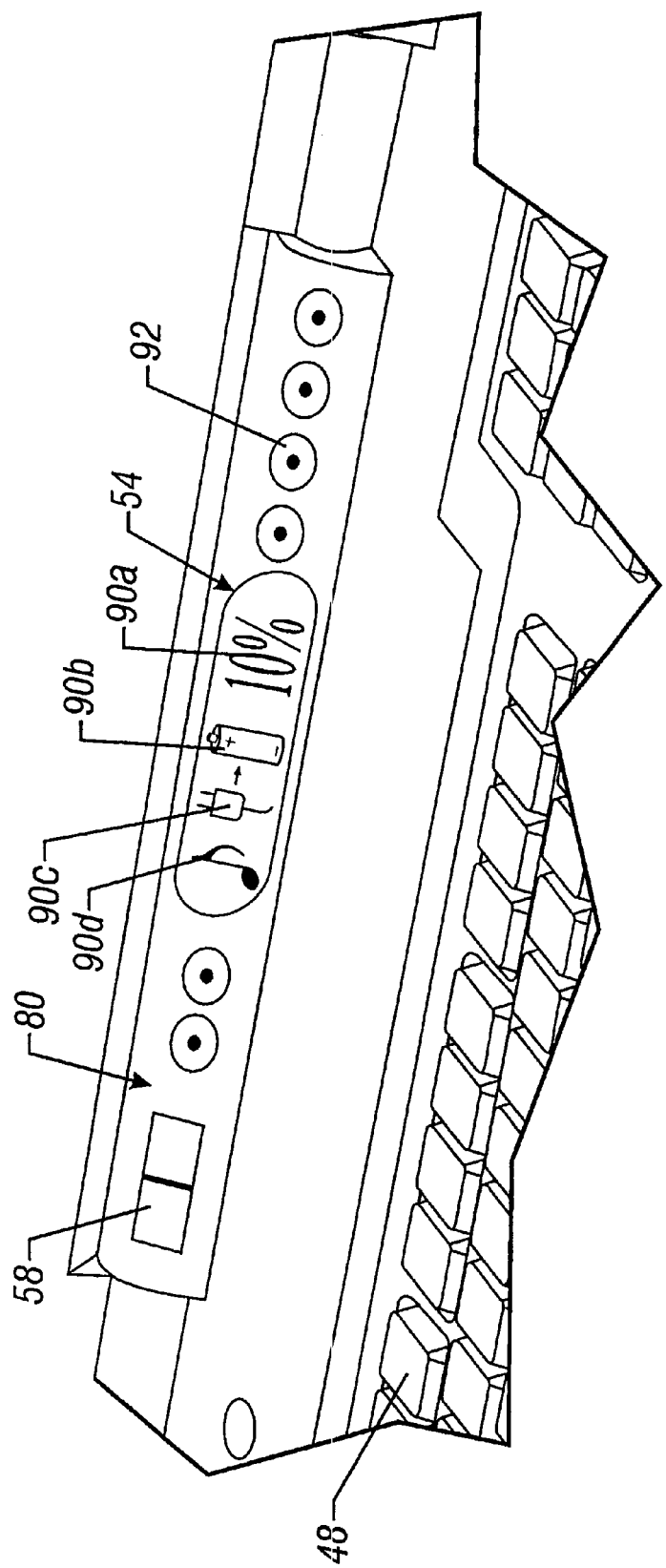
FIG. 2 is an expanded view of a exemplary battery gauge display according to the present invention.

FIG. 2 is an expanded view of a exemplary battery gauge display according to the present invention. As can be seen, the status display 54 incorporates a number of icons 90 for communicating battery charge status and other information. In addition to the status display 54, the readily visible portion 80 of the base B includes a plurality of bezel buttons 90 and a power switch 58. The bezel buttons 90 provide control functions when the portable computer system C is in a secondary mode of operation.

The icons 90 particularly relevant to the present invention include a battery gauge icon 90a that displays the battery charge conditions from 0% to 100% in 10% increments, allowing the computer user to accurately estimate the amount of computing time sustainable by an installed battery pack. The battery gauge icon 90a circumvents the need to power up the computer system and execute a software routine (such as the Windows 95™ Battery Meter) in order to ascertain battery charge conditions. A battery icon 90b is activated when a battery pack is installed in the portable computer system C. Likewise, an AC adapter icon 90c is activated when the computer system is powered by an AC adapter.

The status display 54 also includes an icon 90d representative of a secondary mode of operation for the computer system. In the disclosed embodiment of the invention, the computer system C functions as a stand alone CD player in the secondary mode of operation, as discussed more fully below. In this embodiment, the bezel buttons 92 preferably provide play/pause, stop, previous track, next track, volume controls, and other functions provided by the controls of a typical audio CD player. The status display 54 also preferably includes other icons (not shown) indicating, when active, the current state of the number lock, capitals lock (caps lock) and scroll lock functions of the keyboard 48.

In the disclosed embodiment of the invention, the icons 90 are active under numerous conditions: when the system is powered normally by an AC adapter or battery pack, when the battery pack is charging, when the system is in a sleep or hibernation mode, or when the system is operating in a secondary mode. When the battery gauge icon 90a falls to 10% power remaining, the computer system C beeps and the battery icon 90b flashes. When the battery charge falls to 5% as determined by the multipurpose microcontroller, and an AC adapter is not plugged in, the computer system C beeps twice and automatically enters a hibernation mode. In hibernation mode, the computer system C is "off", and a user must press the power switch 58 to restart the system.

Although the disclosed status display 54 is based on LCD technology, other low-voltage display solutions could be used. The precise nature of the technology utilized is not considered critical to the invention. It is also contemplated that the invention could be utilized with portable computer systems incorporating multiple battery packs. In such systems, the status display 54 could incorporate additional icons 90 providing a fuel gauge for each battery pack. Alternatively, the icons of FIG. 2 could be scrolled to sequentially display the charge status of all installed battery packs.

Figure 3:
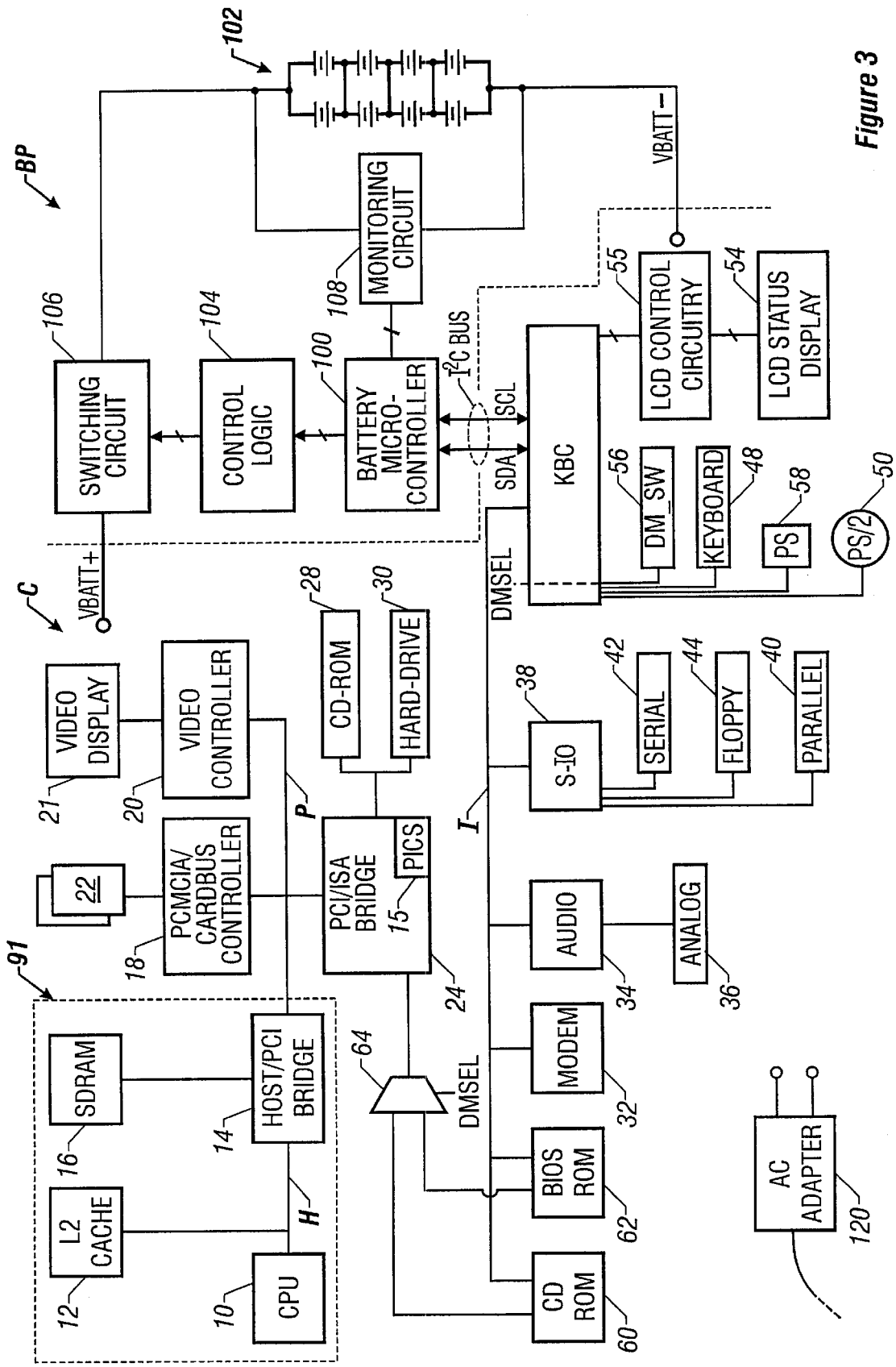
FIG. 3 is a schematic block diagram of a portable computer system incorporating battery gauge display capabilities according to the invention.

Turning now to FIG. 3, a schematic circuit diagram of a computer system C incorporating features according to the present invention is shown. In the preferred embodiment, the computer system C incorporates two primary buses: a Peripheral Component Interconnect (PCI) bus P which includes an address/data portion and a control signal portion; and an Industry Standard Architecture (ISA) bus I which includes an address, portion, a data portion, and a control signal portion. The PCI and ISA buses P and I form the architectural backbone of the computer system C.

A CPU/memory subsystem 91 is connected to the PCI bus P. The CPU 10 and a Level 2 (L2) cache 12 are connected via a processor bus. The CPU 10 preferably operates with a standard IBM-PC compatible operating system, such as Windows 95™. The L2 cache 12 provides caching capabilities that augment the on-chip cache of the CPU 10 to improve the overall performance of the computer system C.

The CPU 10 and the L2 cache 12 are connected to a Host/PCI bridge 14. Synchronous DRAM (SDRAM) 16 is also connected to the Host/PCI bridge 14. The host/PCI bridge 14 functions to couple the CPU/memory subsystem 90 to the PCI bus P. A PCMCIA/CardBus controller 18 is coupled to the PCI bus P, providing connection capabilities for a PCMCIA cards 22. The PCMCIA cards 22 can incorporate a variety of peripheral devices, expanding the versatility of the portable computer C. A video controller circuitry 20 is also connected to the PCI bus P. The video controller 20 controller circuitry incorporates video memory and the necessary analog circuitry for controlling a video display 21.

A PCI/ISA bridge 24 is used to connect the PCI bus P and an ISA bus I. The PCI/ISA bride 24 is used to convert signals between the PCI bus P and the ISA bus I. The PCTASA bridge 24 includes: address and data buffers, arbitration and bus master control logic for the PCI bus P, ISA arbitration circuitry, an ISA bus controller as conventionally used in ISA systems, an IDE (intelligent drive electronics) interface 26, and a DMA controller. A hard disk drive 30 and a CD-ROM drive 28 are connected to the IDE interface 26 of the PCM/ISA bridge 24. Tape drives or other peripheral devices (not shown) can be similarly connected. The IDE interface 26 is an IDE/ATA interface capable of being a busmaster and incorporating enhanced IDE features. The CD-ROM drive 28 is preferably compliant with ATAPI (AT Attachment Packet Interface), the IDE standard for CD-ROM drives.

The PCI/ISA bridge 24 contains a set of programmable interrupt controllers (PICs) 15 for managing hardware interrupts according to their priority. The PICs 15 preferably include two cascaded PICs for enabling interrupts IRQØ-IRQ15. In the disclosed embodiment, the PCI/ISA bridge 24 also includes miscellaneous system logic. This miscellaneous system logic contains counters and activity timers as conventionally present in personal computer systems, an interrupt controller for both the PCI and ISA buses P and I, and power management logic. Additionally, the miscellaneous system logic may include circuitry for a security management system used for password verification and to allow access to protected resources. Preferably, the PCI/ISA bridge 24 is a single integrated circuit, but other combinations are possible.

Numerous other devices are coupled to the ISA bus I. These devices include a modem 32 and an audio chip 34. The audio chip 34 is further coupled to a device 36 for outputting analog signals, such as a set of speakers of the computer system C or an external stereo system. In the case of speakers, they are preferably configured to be audible while display portion D of the computer system C is in a closed state. Also, a combination input/output (S-IO) chip 38 is coupled to the ISA bus I. The S-IO chip 38 incorporates various functions, such as a real-time clock, UARTs, a floppy disk controller for controlling a floppy disk drive 44, various address decode logic and security logic to control access to an internal or external CMOS/NVRAM memory (not shown) and stored password values. Further, the S-I0 chip 38 provides a parallel port 40 and a serial port 42. To more clearly illustrate the features and operation of the present invention, certain other conventional computer devices and systems have been omitted from FIG. 3.

A keyboard controller 46 is also coupled to the ISA bus I. The keyboard controller 46 provides connections for a keyboard 48, a PS/2 port 50 and a power switch 58. The keyboard controller 46 also generates a data signal LCD_DATA and a clock signal LCD_CLK for use by LCD control circuitry 55. The LCD control circuitry 55 provides control signals for the LCD status display 54. Although use of a keyboard controller is disclosed, use of any microcontroller is considered to fall within the scope of the invention. Details of LCD control circuitry in accordance with the invention are discussed more fully below in conjunction with FIG. 4.

The keyboard controller 46 of the present invention also includes system management interrupt (SMI) circuitry for generating system management interrupts. Certain processors, such as the Pentium® processor, include a mode referred to as system management mode (SMM), which is entered upon receipt of a system management interrupt. An SMI is a non-maskable interrupt having almost the highest priority in the system. Generation of a SMI causes an SMI handler routine to be executed. The SMI handler routine is typically located in a protected memory address space accessible only when the CPU 10 is in a system management mode. The SMI handler is essentially an interrupt service routine that can be written to perform specific system management tasks, such as reducing power to specific devices or providing security services. SMI handler code may be written by one of ordinary skill in the art to perform a variety of tasks.

In the disclosed embodiment of the present invention, the computer system C is capable of functioning as a stand alone CD player. To support this exemplary "secondary" mode of operation, the keyboard controller 46 is further coupled to an audio CD mode switch (DM_SW) 56. If the power switch 58 of the computer system C is in an "on" state, the audio CD mode switch 56 is disabled. If the power switch 58 of the computer system C is in an "off" state, the audio CD mode switch 56 is enabled. When the audio CD mode switch 56 is enabled, the state of the switch 56 determines whether the computer system C is in an audio CD mode. The audio CD mode switch 56, when placed in an "on" state, serves to place the computer system C of the present invention in an audio CD mode. Audio CD mode enables the computer system C of the present invention to bypass a traditional system BIOS and play audio CDs in the CD-ROM drive 28 without running an operating system.

When the computer system C of the disclosed embodiment enters an audio CD mode, the processor-memory subsystem 102, the PCI/ISA bridge 24, the CD-ROM drive 28, the host/PCI bridge 14, the audio CD ROM 60, and the keyboard controller 46 are powered. ROM-based code including code for processing CD button selections is then loaded from an alternate ROM device, the audio CD ROM 60, instead of a conventional BIOS ROM device 62. An operating system is not loaded, thereby significantly reducing the duration of the system initialization. Rather than using a ROM device for conventional BIOS code and a separate ROM device for the audio CD code, a single ROM device may be utilized.

According to the disclosed secondary operational mode, when the computer system C is placed in an audio CD mode, an audio CD select signal DMSEL is asserted and directed to a multiplexer 64. The multiplexer 64 is coupled to or integrated into the PCI/ISA bridge 24. If the audio CD select signal is unasserted, the multiplexer 64 selects the contemporary BIOS ROM 62 by asserting a BIOS control signal, BIOS_CS. If the audio CD select signal is asserted, the multiplexer 64 selects the audio CD ROM 60 of the present invention by asserting an audio CD control signal, DM_CS. When selected, the code executed from the audio CD ROM 60 preferably allows the video controller 20, the hard disk drive 30, the floppy disk drive 44, and the PCMCIA/CardBus controller 18 to remain in an unpowered state, thereby conserving system power. Further, in the audio CD mode, the S-IO 38 is preferably placed into a low power state. Further details of an exemplary portable computer system capable of functioning as a stand-alone CD player are provided in the previously incorporated references. It should be noted that the precise manner in which an optional secondary operating modes is implemented in the portable computer system C is not considered critical to the invention.

Referring more specifically to the battery pack BP portion of FIG. 3, details of a battery pack BP inserted into the portable computer system C are shown. The computer system C is capable of both receiving power from and supplying power to the battery pack BP. The terminals VBATT+ and VBATT− are voltage levels at the positive and negative terminals, respectively, of the battery pack BP over which power is supplied to and received from the computer system C. FIG. 3 depicts a single installed battery pack BP, although it is contemplated that a greater number of detachable battery packs could be incorporated in a portable computer system C according to the invention.

A battery microcontroller 100 is incorporated in the battery pack BP to provide supervisory functions for controlling the charging and discharging of the battery cells 102. The battery microcontroller 100 is programmable to support a variety of cell technologies, battery assemblies, or battery configurations. Various signals are provided by the battery microcontroller 100 to a control logic block 104. These signals are used by the control logic block 104 in generating control signals for various elements of a switching circuit 106. Together, the control logic block 104 and the switching circuit 106 provide circuitry to inhibit or permit charge from entering or leaving battery cells 102. The signals generated by the control logic block 104 control the charging, trickle charging and discharging of the battery cells 102.

The switching circuit 106 is connected to a positive terminal "+" of the battery cells 102. In the preferred embodiment, the battery cells 102 of the battery pack BP are shown as four series banks of two parallel cells each. Various transistors in the switching circuit block 106 are used to control the voltage VBATT+ supplied by (or received by) the battery cells 102, as well as current flowing into and out of the battery pack BP.

Also shown in FIG. 3 is a monitoring circuit 108, which is connected to the "+" and "−" terminals of the battery cells 102. The monitoring circuit provides information to the battery microcontroller 100 regarding the status of the battery cells 102 during charging as well as discharging. Functions provided by the monitoring circuit 108 include: battery cell overvoltage monitoring, cell undervoltage monitoring, overdischarge current monitoring, and overcharge current monitoring. The circuit topology of the monitoring circuit 108 may be of several types, as is known to those skilled in the art.

The keyboard controller 46 communicates with the battery microcontroller 100 via a standard $I^2C$-bus. The inter-integrated circuit (IC) or $I^2C$-bus is a simple bi-directional two wire bus developed for efficient inter-IC control. Details of the $I^2C$-bus can be found in "The $I^2C$-bus and How to Use It (Including Specification)," published by Phillips Semiconductor.

Briefly, the $I^2C$-bus consists of two lines: a serial clock (SCL) and a serial data line (SDA). Each of these lines is bi-directional. The SCL line provides the clock signal for data transfers which occur over the $I^2C$-bus. The SDA line is the data line for data transfers which occur over the $I^2C$-bus. Logic levels for these signals are referenced to the voltage VBATT− or other ground voltage. Each device connected to the $I^2C$-bus is recognized by a unique address—whether it is the keyboard controller 46 or the battery microcontroller 100 of any installed battery pack BP. In addition to charge status information, communications between the keyboard controller 46 and the battery microcontroller 100 might include, for example, requests to charge and requests to terminate charging.

Also shown is an AC adapter 120 for supplying power to the portable computer system C. The input for the AC adapter 120 is typically between 90 and 265 VAC RMS. Nominal voltage for the U.S. market is considered to be 120 VAC. The output voltage of the AC adapter 120 must meet the maximum charge voltage of the battery pack BP and the power supply input voltage specification of the portable computer C.

In the preferred embodiment, the AC adapter 120 is a conventional 52-Watt single output AC-to-DC module power supply assembly intended for world-wide use in information technology equipment. The AC adapter 120 is self-contained and powered from AC mains (not shown), and supplies a single direct current (DC), constant power output. No power switch is shown, as output power is supplied upon application of an AC input through an electrical cord 126. The AC adapter 120 can be internal or external device.

Figure 4:
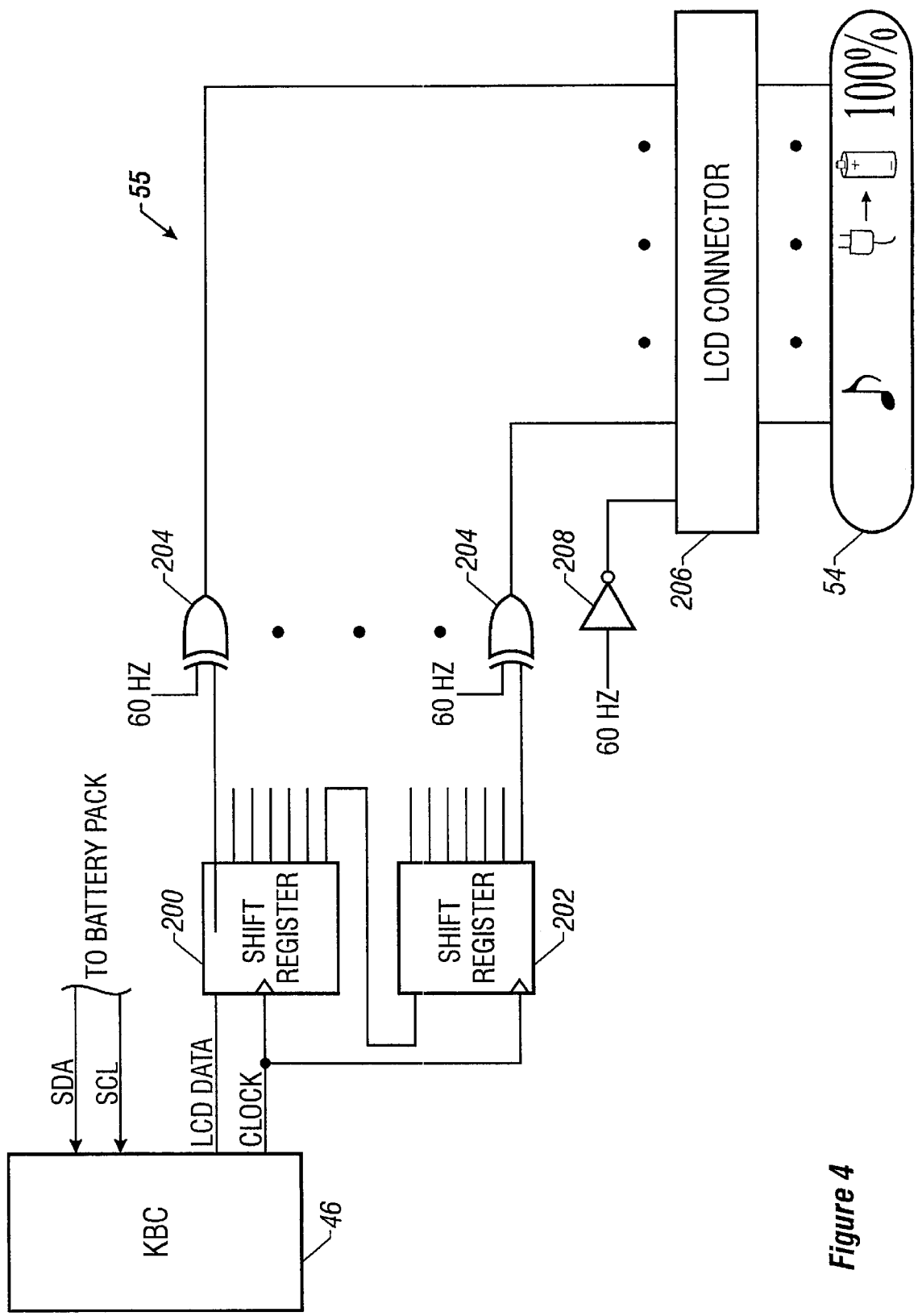
FIG. 4 is schematic block diagram of display control circuitry for controlling a battery gauge display in accordance with the present invention.

Referring now to FIG. 4, a schematic block diagram of LCD control circuitry 55 for controlling the display icons 90 of an LCD status display 54 in accordance with the present invention is shown. The LCD control circuitry 55 is coupled between the keyboard controller 46 and the LCD status display 54. The keyboard controller 46 is coupled to the battery pack BP as discussed above to receive information regarding the charge state of the battery cells 102. Based on this information, the keyboard controller 46 activates the appropriate display segments of the LCD status display 54.

More particularly, the keyboard controller 46 generates an LCD DATA signal that is communicated to data input of an serial-in, parallel-out shift register 200. The keyboard controller 46 also generates a CLOCK signal that is provided to the clock inputs of shift registers 200 and 202. One output of the shift register 200 is provided to the data input of the shift register 202. The other outputs of the shift register 200 and 202 are used to generate separate activation signals for the segments of the display icons 90 of the LCD status display 54. In operation, data is clocked into the shift registers 200 and 202 by the CLOCK signal from the keyboard controller 46, and is thereby converted to a parallel data. By using this configuration, only two pins from the keyboard controller 46 need be dedicated to the operation of the LCD status display 54.

The outputs of the shift registers 200 and 202 are provided, individually, to one input of an exclusive-or gate in a bank of exclusive-or gates 204. The other input of each exclusive-or gate is clocked by a 60 Hz clock signal. The outputs of the exclusive-or gates 204 are thus refreshed sixty times a second. The output of each exclusive-or gate 204 is connected to the control lines for the segments of the display icons 90 of the LCD status display 54 through an LCD Connector 206. The outputs of the LCD Connector are modulated with an inverted version of the 60 Hz clock signal through an inverter 208. This modulation prevents damage to the elements of the LCD status display 54.

Thus, a user of a portable computer system according to the invention can quickly and accurately ascertain the remaining cycle life of an installed battery pack when the main display is either opened or closed. The computer system incorporates an autonomous, real-time battery gauge display that is activated when the system is powered up, when the battery is being recharged by an AC adapter, or when the portable computer is placed into a secondary operating mode. The battery gauge display functions independently of the portable computer's operating system, and the computer user need not initiate a software process in order to ascertain remaining battery life.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A portable computer system adapted to receive a battery pack and incorporating a battery gauge display, comprising:
   a base portion for housing a keyboard and a processor;
   the processor having a main operating system for the portable computer system;
   a main display portion coupled to the base portion and movable between an open position and a closed position;
   a status display integrated into the base portion, the status display being visible when the main display portion is in a closed position, the status display incorporating a battery gauge icon representative, when activated, of the charge condition of a battery pack;
   a microcontroller for generating control signals for the status display in response to information received from the battery pack, wherein the microcontroller controls the status display independent from the main operating system during a secondary operational mode of the portable computer system.

2. The portable computer system of claim 1, wherein the battery gauge icon is active when the battery pack is being charged via an AC adapter.

3. The portable computer system of claim 1, wherein the battery gauge icon is active when the portable computer system is receiving power from a battery pack.

4. The portable computer system of claim 1, wherein the battery gauge icon is active when portable computer system is in a low-power mode of operation.

5. The portable computer system of claim 1, wherein the battery gauge icon is active when the portable computer system is in the secondary operational mode.

6. The portable computer system of claim 5, wherein the secondary operational mode is a mode for playing audio CDs in a CD-ROM drive independent of the operating system.

7. The portable computer system of claim 5, wherein the status display further incorporates an indicator representative of computer system operation in the secondary operational mode.

8. The portable computer system of claim 1, wherein the battery gauge icon is a graduated percentage scale representing the remaining percentage of the maximum charge life of a battery pack.

9. The portable computer system of claim 1, wherein the status display further incorporates a battery icon representative, when activated, of the presence of an installed battery pack.

10. The portable computer system of claim 1, wherein the status display further incorporates an AC adapter icon representative, when activated, of the presence of an AC adapter coupled to the portable computer system.

11. The portable computer system of claim 1, wherein the status display screen is located above the keyboard.

12. The portable computer system of claim 1, wherein the status display screen is implemented with liquid crystal display technology.

13. A portable computer system adapted to receive a battery pack and incorporating a battery gauge display, comprising:

a base portion for housing a keyboard and a processor;

a main display portion coupled to the base portion and movable between an open position and a closed position;

a status display integrated into the base portion, the status display being visible when the main display portion is in either of an open position or a closed position, the status display incorporating a battery gauge icon representative, when activated, of the charge condition of a battery pack;

a microcontroller for generating control signals for the status display in response to information received from the battery pack, wherein the microcontroller controls the status display independent from the main operating system during a secondary operational mode of the portable computer system.

14. The portable computer system of claim 13, wherein the battery gauge icon is active when the portable computer system is in the secondary operational mode.

15. A method for displaying battery charge information in a portable computer system having a processor, a battery pack, a base portion, a main display portion coupled to the base portion and movable between an open position and a closed position, and a microcontroller coupled to the battery pack, the method comprising the steps of:

retrieving with the microcontroller charge status information from the battery pack during a secondary operational mode of the portable computer system independent of a main operating system of the portable computer system;

generating status display control signals based on the charge status information retrieved from the battery pack; and communicating the status display control signals to a status display integrated into the base portion and visible when the main display portion is in a closed position, such that battery pack charge status information is displayed in a manner indicating the percentage of charge remaining in the battery pack during the secondary operational mode.

16. The method of claim 15, wherein the status display is additionally visible when the main display portion is in an open position.

17. The method of claim 15, wherein the steps are performed while the portable computer system is in the secondary operational mode.

18. The method of claim 15, wherein the steps are performed while the portable computer system is in a low-power mode of operation.

* * * * *